(12) United States Patent
Mathan et al.

(10) Patent No.: US 8,271,074 B2
(45) Date of Patent: Sep. 18, 2012

(54) DYNAMIC CALIBRATION OF PHYSIOLOGICALLY DRIVEN IMAGE TRIAGE SYSTEMS

(75) Inventors: Santosh Mathan, Minneapolis, MN (US); Patricia M. Ververs, Ellicott City, MD (US); Misha Pavel, Portland, OR (US)

(73) Assignee: Honeywell International Inc., Morristown, NJ (US)

( * ) Notice: Subject to any disclaimer, the term of this patent is extended or adjusted under 35 U.S.C. 154(b) by 1328 days.

(21) Appl. No.: 11/947,325

(22) Filed: Nov. 29, 2007

(65) Prior Publication Data

US 2009/0141007 A1    Jun. 4, 2009

(51) Int. Cl.
*A61B 5/04* (2006.01)
*G06F 15/00* (2006.01)
*G06K 9/00* (2006.01)

(52) U.S. Cl. .............................. 600/544; 700/1; 382/181

(58) Field of Classification Search .................. None
See application file for complete search history.

(56) References Cited

U.S. PATENT DOCUMENTS

| | | | |
|---|---|---|---|
| 5,571,057 A | 11/1996 | Ayers | |
| 5,846,207 A | 12/1998 | Rosenfeld | |
| 6,206,700 B1 | 3/2001 | Brown et al. | |
| 6,292,688 B1 | 9/2001 | Patton | |
| 6,315,569 B1 | 11/2001 | Zaltman | |
| 6,377,833 B1 | 4/2002 | Albert | |
| 6,421,463 B1 | 7/2002 | Poggio et al. | |
| 6,694,047 B1 | 2/2004 | Farrokhnia et al. | |
| 7,039,256 B2 | 5/2006 | Zlotnick et al. | |
| 7,110,989 B2 | 9/2006 | Iemoto et al. | |
| 2005/0084136 A1 | 4/2005 | Xie et al. | |
| 2006/0093998 A1 | 5/2006 | Vertegaal | |
| 2007/0173699 A1 | 7/2007 | Mathan et al. | |

OTHER PUBLICATIONS

Mathan et al., Oct. 2006, pp. 9 of 9, Neurotechnology for Image Analysis: Searching for Needles in Haystacks Efficiently. Note that Mathan et al. is an IDS document filed by applicant in prior U.S. Appl. No. 11/513,723, but priority thereto is not claimed in the instant application. A publication date of Oct. 2006 therefor is listed on the PTO.*
Gerson, A., et al., Cortical Origins of Response Time Variability During Rapid Discrimination of Visual Objects, NeuroImage, May 23, 2005.
Issen, Laurel, Using edge statistics for object recognition, May 15, 2006.
Peters, R., et al., Image Complexity Metrics for Automatic Target Recogniziers, 1990 Automatic Target Recognizers System and Technology Conference, Oct. 30-31, 1990.

* cited by examiner

*Primary Examiner* — John S Brusca
(74) *Attorney, Agent, or Firm* — Ingrassia Fisher & Lorenz, P.C.

(57) ABSTRACT

A system and method of dynamically calibrating an image triage system. An image that may include one or more target entities is divided into a plurality of individual non-calibration image chips. Each non-calibration image chip is successively displayed to a user for a presentation time period. A calibration image chip that includes a synthetic target entity is selectively displayed, for the presentation time period, between the successive display of two non-calibration image chips. Calibration data are collected from the user at least while each calibration image chip is being displayed, and the image triage system is dynamically calibrated using the calibration data.

17 Claims, 4 Drawing Sheets

DYNAMIC CALIBRATION OF PHYSIOLOGICALLY DRIVEN IMAGE TRIAGE SYSTEMS

STATEMENT REGARDING FEDERALLY SPONSORED RESEARCH OR DEVELOPMENT

This invention was made with Government support under contract HM1582-05-C-0046 awarded by the Defense Advanced Research Projects Agency (DARPA). The Government has certain rights in this invention.

TECHNICAL FIELD

The present invention generally relates to a system and method for efficiently conducting image triage and, more particularly, to a system and method for dynamically calibrating neurally-driven high speed image triage systems.

BACKGROUND

Analysts in various professions may, at times, be called upon to search relatively large collections of imagery to identify, if present, various types of relevant information (referred to herein as "a target entity" or "target entities") in the collection of imagery. For example, medical analysts sometimes diagnose a physical impairment by searching complex imagery collections to identify one or more target entities therein that may be the cause of the physical impairment. Moreover, intelligence analysts may be called upon to search relatively complex imagery collections to identify target entities therein that may relate to various types of intelligence gathering activities.

Advancements in both image collection and storage technology presently allow for the relatively low-cost storage of large volumes of high-quality imagery. However, the cost of searching through large sets of imagery for target entities can often be substantial. Indeed, in many professions, such as intelligence gathering, effective searching may rely on the expertise of highly skilled analysts, who typically search through relatively large sequences of images in a relatively slow manner. Presently, the number of skilled analysts available to search the amount of imagery that is stored, or can potentially be stored, is in many instances insufficient.

In response to the foregoing, there has relatively recently been a focus on developing various systems and methods for triaging imagery. One of the methods that has shown promise combines electroencephalography (EEG) technology and rapid serial visualization presentation (RSVP). Various implementations of this combination have been researched and developed. For example, researchers have experimented with a system in which users are presented, using the RSVP paradigm, a sequence of images, some of which may include particular types of target entities. During the RSVP presentation, EEG data and/or physical response data are collected from the users. A trainable classifier processes the collected EEG data and/or physical response data to assign probabilities to each image. The probabilities are representative of the likelihood an image includes a target.

Although useful in sorting a sequence of images, the above described system and method, as well as other systems and methods that employ these same technologies, do suffer certain drawbacks. For example, prior to the performance phase, in which images are searched for target entities, present systems and methods typically implement a calibration phase. During the calibration phase, images with known target entities are displayed to a user, and these data are used to train (or calibrate) the classifier. Present systems and methods thus rely on the calibration data collected during the calibration phase, even though signal characteristics during the performance phase may have changed since completion of the calibration phase. In particular, the characteristics of both the neural signals and/or the physical response signals change over time. As a result, the classifier may not be as accurate during later portions of the performance phase, which may lead to degraded target detection performance.

Hence, there is a need for an efficient and effective system and method for increasing the likelihood of target identification in images after an initial calibration phase and throughout a performance phase. The present invention addresses at least this need.

BRIEF SUMMARY

In one embodiment, and by way of example only, a method of dynamically calibrating an image triage system includes dividing an image that may include one or more target entities into a plurality of individual non-calibration image chips. Each non-calibration image chip is successively displayed to a user for a presentation time period. A calibration image chip that includes a synthetic target entity is selectively displayed, for the presentation time period, between the successive display of two non-calibration image chips. Calibration data are collected from the user at least while each calibration image chip is being displayed. The image triage system is dynamically calibrated using the calibration data.

In yet another exemplary embodiment, a dynamically calibrated image triage system that is used to triage an image that may include one or more target entities includes a display, a data collector, and a processor. The display device is operable to receive display commands and, in response thereto, to display an image. The data collector is configured to at least selectively collect data from a user. The processor is coupled to receive the collected data from the data collector. The processor is further coupled to the display device and is configured to selectively retrieve an image, divide the image into a plurality of individual non-calibration image chips, successively command the display device to display each non-calibration image chip to a user for a presentation time period, selectively command the display device to display, for the presentation time period, a calibration image chip between the successive display of two non-calibration image chips, and dynamically calibrate the image triage system based at least in part on the data collected from the user at least while the calibration image chip is displayed.

Furthermore, other desirable features and characteristics of the image triage system and method will become apparent from the subsequent detailed description and the appended claims, taken in conjunction with the accompanying drawings and this background.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background or the following detailed description.

Figure 1:
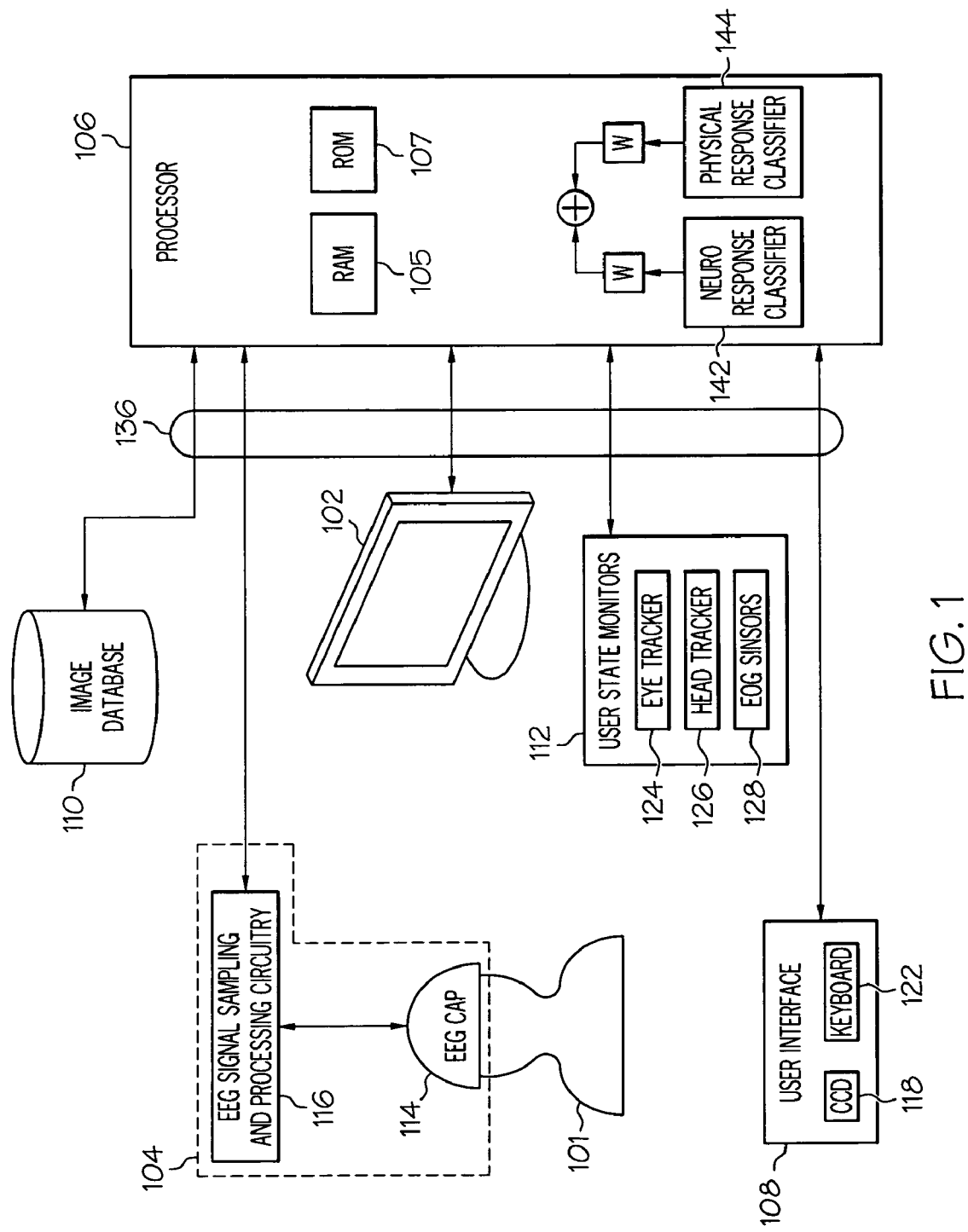
FIG. 1 depicts a functional block diagram of an exemplary image triaging system.

Turning first to FIG. 1, a functional block diagram of an exemplary system 100 that may be used to triage images is depicted. The depicted system 100 includes a display device 102, a data collector 104, and a processor 106. As FIG. 1 further depicts, in some embodiments the system 100 may additionally include a user interface 108, an image database 110, and one or more user state monitors 112. The display device 102 is in operable communication with the processor 106 and, in response to display commands received therefrom, displays one or more images to a user 101. It will be appreciated that the display device 102 may be any one of numerous known displays suitable for rendering graphic, icon, and/or textual images in a format viewable by the user 101. Non-limiting examples of such displays include various cathode ray tube (CRT) displays, and various flat panel displays such as, for example, various types of LCD (liquid crystal display) and TFT (thin film transistor) displays. The display may additionally be based on a panel mounted display, a head up display (HUD) projection, or any known technology.

The data collector 104 in the depicted embodiment is a neurophysiological data collector that is configured to be disposed on, or otherwise coupled to, the user 101, and is operable to selectively collect neurophysiological data from the user 101. Preferably, and as depicted in FIG. 1, the neurological data collector 104 is implemented as an electroencephalogram (EEG) system, and most preferably as a multi-channel EEG cap 114, and appropriate EEG signal sampling and processing circuitry 116. It will be appreciated that the number of EEG channels may vary. Moreover, the EEG signal sampling and processing circuitry 116 may be implemented using any one of numerous known suitable circuits and devices including, for example, one or more analog-to-digital converters (ADC), one or more amplifiers, and one or more filters. No matter the particular number of EEG channels and the particular type of EEG signal sampling and processing circuitry 116 that is used, it is in operable communication with, and is configured to supply the collected EEG data to, the processor 106. As will be described in more detail further below, the EEG signal sampling and processing circuitry 116 is further configured to receive trigger signals from the processor 106, and to record the receipt of these trigger signals concurrently with the EEG signals.

The user interface 108 is in operable communication with the processor 106 and is configured to receive input from the user 101 and, in response to the user input, supply various signals to the processor 106. The user interface 108 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 102 includes a CCD 118 and a keyboard 122. The user 101 may use the CCD 118 to, among other things, move a cursor symbol on the display device 102, and may use the keyboard 122 to, among other things, input various data. As will be described further below, the user 101 may additionally use either the CCD 118 or keyboard 122 to selectively supply physical response data, the purpose of which are also described further below.

The image database 110 preferably has various types of imagery collections stored therein. The imagery collection types may vary, and may include, for example, various types of static imagery and various types of video imagery. It will additionally be appreciated that, although the image database 110 is, for clarity and convenience, shown as being stored separate from the processor 106, all or portions of this database 110 could be loaded into the on-board RAM 105, or integrally formed as part of the processor 106, and/or RAM 105, and/or ROM 107. The image database 110, or the image data forming portions thereof, could also be part of one or more non-illustrated devices or systems that are physically separate from the depicted system 100.

The one or more user state monitors 112, if included, are operable to selectively collect various data associated with the user 101. The one or more user state monitors 112 may include at least an eye tracker 124, a head tracker 126, and one or more EOG (electrooculogram) sensors 128. The eye tracker 124, if included, is configured to detect the movement of one or both of the user's pupils. The head tracker 126, if included, is configured to detect the movement and/or orientation of the user's head. The EOG sensors 128, if included, are used to detect eye blinks and various eye movements of the user 101. Although any one of numerous devices may be used to implement the eye tracker 124 and head tracker 126, in the depicted embodiment one or more appropriately mounted and located video devices, in conjunction with appropriate processing software components are used to implement these functions. Though not explicitly depicted in FIG. 1, appropriate signal sampling and processing circuitry, if needed or desired, may be coupled between the eye tracker 124 and/or the head tracker 126 and the processor 106. Moreover, the same or similar signal sampling and processing circuitry 116 that is used with the EEG cap 114 may additionally be used to supply appropriate EOG signals to the processor 106. It will be appreciated that, at least in some embodiments, the system 100 may be implemented without one or all of the user state monitors 112. No matter which, if any, of the user state monitors 112 that are included in the system 100, each supplies appropriate user state data to the processor 106.

The processor 106 may include one or more microprocessors, each of which may be any one of numerous known general-purpose microprocessors or application specific processors that operate in response to program instructions. In the depicted embodiment, the processor 106 includes on-board RAM (random access memory) 105, and on-board ROM (read only memory) 107. The program instructions that control the processor 106 may be stored in either or both the RAM 105 and the ROM 107. For example, the operating system software may be stored in the ROM 107, whereas various operating mode software routines and various operational parameters may be stored in the RAM 105. It will be appreciated that this is merely exemplary of one scheme for storing operating system software and software routines, and that various other storage schemes may be implemented. It will also be appreciated that the processor 106 may be implemented using various other circuits, not just one or more programmable processors. For example, digital logic circuits and analog signal processing circuits could also be used.

No matter its specific configuration and implementation, the processor 106 is in operable communication with the display device 102, the neurophysiological data collector 104, the user interface 108, and the image database 110 via, for example, one or more communication buses or cables 136. The processor 106 is configured to selectively retrieve one or more images from the image database 110 for selective display on the display device. In particular, and as will be described in more detail further below, the processor 106 may divide a retrieved image up into several smaller discrete sub-images, referred to herein as image chips, for display on the display device 102. The processor 106 is additionally coupled to receive neurophysiological data from the neurophysiological data collector 104, and may additionally receive physical response data from the user interface 108. The processor 106, based at least in part on one or more of these data, assigns probabilities to the image chips of a retrieved image. The assigned probabilities are representative of the likelihood that the image chips include a target entity.

Although the processor 106 may implement various techniques to assign the probabilities to displayed image chips, preferably the processor 106 implements one or more trainable classifiers associated with the user 101. A trainable classifier, as is generally known, may be trained (or calibrated) during a calibration phase. As will be described in more detail further below, the trainable classifiers implemented by the depicted processor 106 may also be dynamically calibrated during a subsequent performance phase. In the depicted embodiment, the processor 106 implements two trainable classifiers—a neurophysiological classifier 142 and a physical response classifier 144. It will be appreciated that any one of numerous known trainable classifiers may be used. However, in a particular preferred embodiment, a support vector machine (SVM) is used to implement each classifier 142, 144. It will be appreciated that any one of numerous types of SVMs may be used to implement the system 100, but in a particular preferred embodiment non-linear SVMs with a radial basis function kernel are used.

No matter the particular specie or sub-specie of classifiers that are used, each classifier 142, 144, during the performance phase, may determine the probability that an image chip includes a target entity. The outputs from the two classifiers 142, 144, at least in the depicted embodiment, may then be combined using a weighted combination of each classifier 142, 144 to generate combined values. For example, in a particular preferred embodiment the outputs of the neurophysiological classifier 142 are weighted twice as high as the outputs of the physical response classifier 144. It will be appreciated that the specific and relative weighting of the classifier outputs may vary, and that weighting the outputs of the neurophysiological classifier 142 twice as high as the outputs of the physical response classifier 144 is merely exemplary. Nonetheless, in the depicted embodiment, the combined values are scaled to provide values between 0.0 and 1.0 for each image chip, which are representative of the probability that each image chip includes a target entity.

It was additionally noted above that the processor 106, at least in some embodiments, may also receive user state data from the one or more user state monitors 112. In such embodiments, the processor 106 appropriately processes the user state data and the neurophysiological data to determine whether one or more of these data, either alone or in combination, indicate the user 101 is in a state that could adversely compromise the effectiveness of the image triage processing. It is noted that, based on this determination, the processor 106 may generate one or more user alerts and/or vary the pace of one or more portions of the below-described image triage processing.

As alluded to previously, during a calibration phase various calibration images are displayed to a user 101. The calibration images may be stored in the image database 110, in the RAM 105 or ROM 107, or in another non-depicted storage device. As the calibration images are being displayed, neurophysiological data, physical response data, or both, are collected from the user 101 and supplied to the processor 106 to calibrate the image triage system 100, and more specifically the classifiers 142, 144. Thereafter, during a performance phase, non-calibration image chips are successively displayed to the user 101, and neurophysiological data, physical response data, or both, are collected from the user 101 and supplied to the processor 106. The processor 106, based at least in part on one or more of these data, assigns probabilities to each non-calibration image chip. These assigned probabilities are representative of the likelihood that the non-calibration image chips include a target entity. As was also noted above, the processor 106 may dynamically calibrate the image triage system 100 during the performance phase. The overall process 200 by which the processor 106 implements these functions is depicted in flowchart form in FIG. 2, and with reference thereto will now be described in more detail. Before doing so, however, it is noted that the depicted process 200 is merely exemplary of any one of numerous ways of depicting and implementing the overall process to be described. Moreover, before the process 200 is initiated, it is noted that, if neurophysioligical data are collected, at least the neurophysiological data collector 104 has preferably been properly applied to the user 101, and appropriately configured to collect neurophysiological data. If included, the one or more user monitors 112 have also preferably been applied to the user 101, and appropriately configured to collect user state data. With this background in mind, it is additionally noted that the numerical parenthetical references in the following description refer to like steps in the flowchart depicted in FIG. 2.

Turning now to the description of the process 200, it is seen that the system 100 is first calibrated for the user 101 by initiating a calibration phase (202). As noted above, during the calibration phase (202) various calibration images are displayed to the user 101 and, as the calibration images are displayed, neurophysiological data, physical response data, or both, are collected from the user 101 and supplied to the processor 106. These data are then used to calibrate the image triage system 100, and more specifically the classifiers 142, 144. After the calibration phase (202) is complete, a performance phase may then be initiated (204). It will be appreciated that that other physiological data types, in addition to or instead of neurophysiological data and/or physical response data, could also be used.

Figure 3:
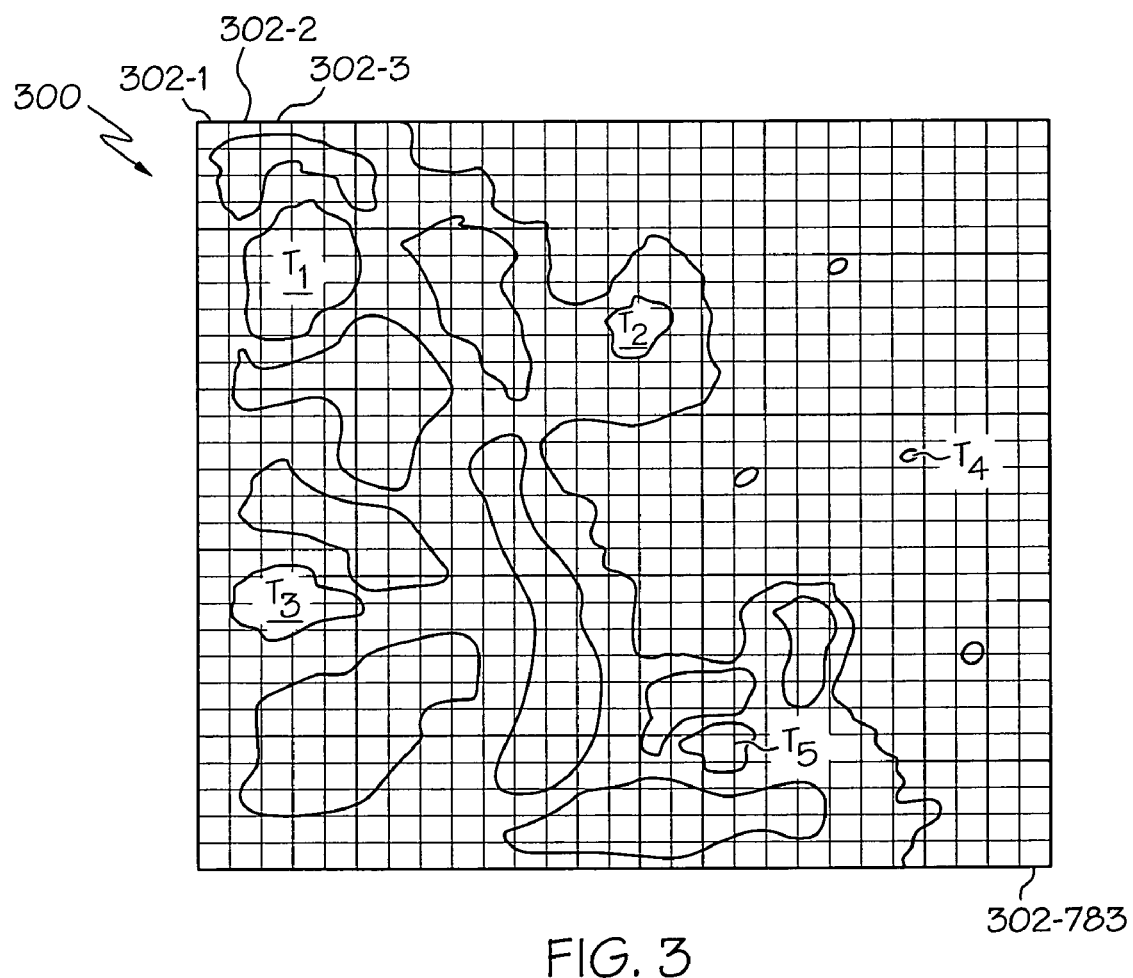
FIG. 3 depicts how an image may be divided into individual image chips, in accordance with a particular embodiment of the present invention.

During the performance phase (204), an image is retrieved from the image database 110, and is divided into a plurality of non-calibration image chips (206). More specifically, and with reference to FIG. 3, the retrieved image 300, which in the depicted embodiment is a simplified representation of a broad area image of a port region, is divided into N-number of discrete non-calibration image chips 302 (e.g., 302-1, 302-2, 302-3, . . . 302-N). It will be appreciated that the number of non-calibration image chips 302 that a retrieved image 300 may be divided into may vary, and may depend, for example, on the size and/or resolution of the retrieved image 300. In the embodiment depicted in FIG. 3, the retrieved image 300 is divided into 783 non-calibration image chips (i.e., N=783).

Returning once again to FIG. 2, after the image 300 has been divided into the plurality of non-calibration image chips 302, the non-calibration image chips 302 are individually and successively displayed, on the display device 102, to the user 101 (208). In particular, the non-calibration image chips 302 are preferably presented using a rapid serial visualization presentation (RSVP) technique. Thus, each non-calibration image chip 302 is individually displayed, preferably at the same location on the display device 102, for a presentation time period, preferably in a predetermined sequence, and preferably at substantially equivalent luminance levels. It will be appreciated that the presentation time period may vary, and may be selected by the user 101.

Figure 2:
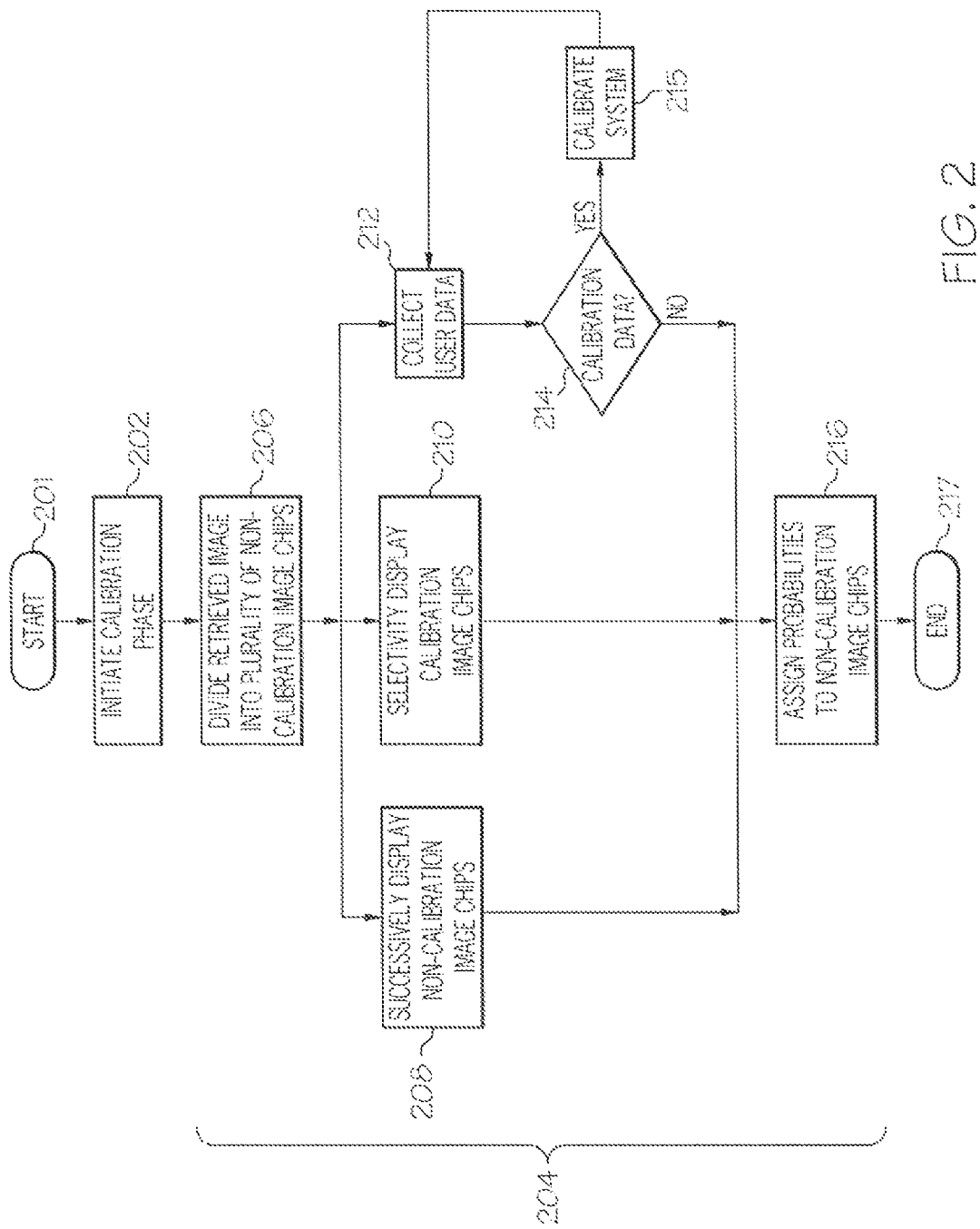
FIG. 2 depicts an exemplary process, in flowchart form, that may be implemented by the image triaging system of FIG. 1.
Figure 4:
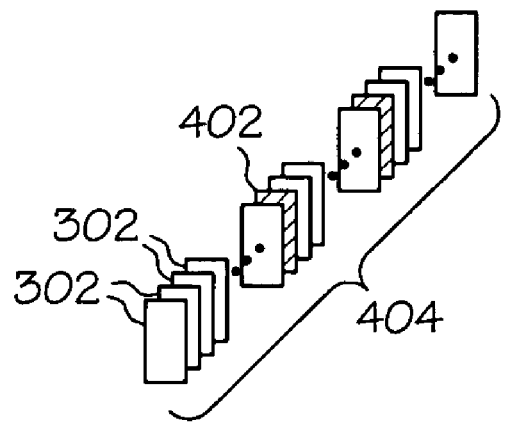
FIG. 4 depicts a particular rapid serial visualization presentation paradigm that may be implemented in accordance with an embodiment of the present invention.

As FIG. 2 further depicts, as the non-calibration image chips 302 are being successively displayed during the performance phase, one or more calibration image chips are also selectively displayed to the user 101 (210). More specifically, and as FIG. 4 depicts more clearly, a calibration image chip 402 is selectively inserted into the RSVP stream 404 of the non-calibration image chips 302, and thus selectively displayed between the successive display of two non-calibration image chips 302. Preferably, whenever a calibration image chip 402 is displayed, it is displayed for the same presentation time period as each of the non-calibration image chips 302. Although FIG. 4 depicts a plurality of calibration image chips 402 being displayed during the performance phase, it will be appreciated that in some instances only a single calibration image chip 402 may be displayed during the performance phase. If more than one calibration image 402 is displayed during the performance phase, then the calibration image chip 402 may be randomly displayed between the display of two successive non-calibration image chips 302, or at a set periodicity. It will additionally be appreciated that the same calibration image chip 402 may be displayed each time, or a plurality of calibration image chips 402 may be displayed either randomly or in a predetermined order.

Figure 5:
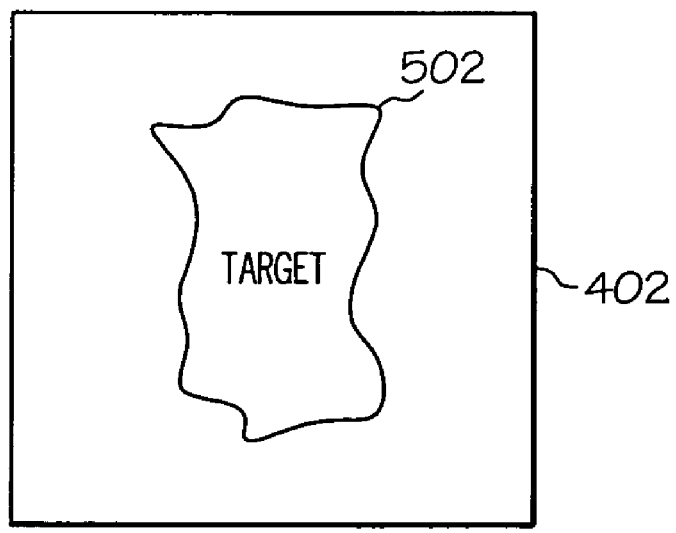
FIG. 5 depicts an exemplary calibration image.

Before proceeding further, and with quick reference to FIG. 5, it is noted that a calibration image chip 402 is an image that includes a known target entity 404, and is thus referred to herein as a synthetic target entity. The calibration image chips 402 that are displayed during the performance phase may be one or more of the same images that are used during the calibration phase (202), or the calibration image chips 402 may be wholly different.

Returning once again to FIG. 2, it is seen that while the non-calibration and calibration image chips 302, 402 are being displayed to the user 101, user data such as, neurophysiological data, physical response data, or both, are collected from the user 101 (212). As was noted above, in some embodiments, user state data may additionally be collected via the user interface 108 and the one or more state monitors 112, respectively. As was also previously noted, if neurophysiological data are collected, these data are preferably EEG data collected via the multi-channel EEG cap 114. It will be appreciated that, if collected, either the CCD 118 or the keyboard 122 may be used to collect the physical response data. In particular, the user 101 will hit either a predetermined button on the CCD 118 or a predetermined key on the keyboard 122 each time the user 101 believes a displayed image chip 302, 402 includes a target entity, or at least a portion of a target entity. In the depicted embodiment, the image 300 includes five target entities that, for simplicity of illustration, are labeled $T_1$ through $T_5$ on FIG. 3. It will be appreciated that in an actual physical implementation, the image 300 may include any number of target entities, which may be, for example, various types of land vehicles, seagoing vessels, special use land masses, weapons sites, or military bases, just to name a few examples.

As previously noted, while the data are being collected, the processor 106 supplies image triggers, or brief pulses, to the neurophysiological data collector 104. The image triggers are supplied each time a non-calibration or calibration image chip 302, 402 is displayed. During subsequent processing, which is described further below, a segment of neurophysiological data and a segment physical response data are extracted around each image trigger. These segments, referred to as epochs, contain neuophysiological data and physical response data from a predetermined time before an image trigger to a predetermined time after the image trigger. It will be appreciated that the predetermined time period before and after each image trigger, and concomitantly the total length of each epoch of data, may vary.

While the non-calibration and calibration image chips 302, 402 are being displayed the processor 106 also determines whether the collected data are non-calibration data or calibration data (214). As used herein, non-calibration data are data associated with a non-calibration image chip 302, and calibration data are data associated with a calibration image chip 402. Each time calibration data are collected, these data are used to dynamically calibrate the system 100 (215). In the depicted embodiment, dynamic calibration means updating the calibration of the classifiers 142, 144. The dynamically updated classifiers 142, 144 process the non-calibration data, as described above, to assign a probability to each non-calibration image chip 302 (216). The probability that is assigned to each non-calibration image chip 302 is representative of the likelihood that the non-calibration image chip 302 includes a target entity.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of dynamically calibrating an image triage system, comprising the steps of:

displaying a plurality of calibration image chips to a user during a calibration phase;

collecting calibration phase data from the user during the calibration phase;

calibrating the image triage system using the calibration phase data;

dividing, in a processor, an image that may include one or more target entities into a plurality of individual non-calibration image chips; and during a subsequent performance phase:

successively displaying on a display device each non-calibration image chip to the user for a presentation time period;

selectively displaying, on the display device for the presentation time period, a calibration image chip between the successive display of two non-calibration image chips, the calibration image chip including a synthetic target entity;

collecting calibration data from the user, via a data collector, at least while each calibration image chip is being displayed on the display device; and dynamically calibrating the image triage system using the calibration data.

2. The method of claim 1, further comprising:
collecting non-calibration data from the user at least while each non-calibration image chip is being displayed; and
for each non-calibration image chip, assigning a probability that the non-calibration image chip at least includes a target entity, based at least in part on the collected non-calibration data.

3. The method of claim 2, further comprising:
collecting the non-calibration data and the calibration data from the user for a predetermined time period, the predetermined time period beginning a predetermined time before a non-calibration image chip and a calibration image chip, respectively, are displayed, and ending a predetermined time after a non-calibration image chip and a calibration image chip, respectively, are displayed.

4. The method of claim 2, wherein the collected calibration data and the collected non-calibration data are neurophysiological data.

5. The method of claim 2, wherein the collected calibration data and the collected non-calibration data are physical response data.

6. The method of claim 2, wherein:
the collected calibration data are neurophysiological data and physical response data; and
the collected non-calibration data are neurophysiological data and physical response data.

7. The method of claim 1, further comprising:
displaying a plurality of calibration image chips to the user during a calibration phase, the calibration phase occurring prior to the step of successively displaying each individual image chip.

8. The method of claim 7, further comprising:
collecting calibration phase data from the user during the calibration phase; and
calibrating the image triage system using the calibration phase data.

9. The method of claim 1, wherein the non-calibration image chips and the calibration image chips are displayed to the user in accordance with a rapid serial visualization presentation (RSVP) paradigm.

10. The method of claim 1, further comprising:
monitoring one or more states of the user; and
supplying one or more alerts to the user based on the one or more states of the user,
wherein the monitored states of the user include one or more states from the group consisting of user attention lapses, eye activity, and head movements.

11. A system for conducting image triage of an image that may include one or more target entities, comprising:
a display device operable to receive display commands and, in response thereto, to display an image;
a data collector configured to at least selectively collect data from a user;
a processor coupled to receive the collected data from the data collector, the processor further coupled to the display device and configured to:
command the display device to display a plurality of calibration image chips to a user during a calibration phase:
collect calibration phase data from the user during the calibration phase; calibrate the image triage system using the calibration phase data; and
during a subsequent performance phase:
selectively retrieve an image,
divide the image into a plurality of individual non-calibration image chips,
successively command the display device to display each non-calibration image chip to a user for a presentation time period,
selectively command the display device to display, for the presentation time period, a calibration image chip between the successive display of two non-calibration image chips, the calibration image chip including a synthetic target entity, and
dynamically calibrate the image triage system based at least in part on the data collected from the user at least while the calibration image chip is displayed.

12. The system of claim 11, wherein the processor is further configured to assign a probability to each displayed non-calibration image chip based at least in part on the data collected at least when each non-calibration image chip is displayed, each assigned probability representative of a likelihood that the non-calibration image chip at least includes a target entity.

13. The system of claim 12, wherein the collected data are neurophysiological data.

14. The system of claim 12, wherein the collected data are physical response data.

15. The system of claim 12, wherein:
the collected calibration data are neurophysiological data and physical response data; and
the collected non-calibration data are neurophysiological data and physical response data.

16. The system of claim 11, wherein the processor is further configured to command the display to display the non-calibration image chips and the calibration image chips in accordance with a rapid serial visualization presentation (RSVP) paradigm.

17. The system of claim 11, further comprising:
one or more user state monitors configured to monitoring sensor one or more states of the user and supply user state data representative thereof,
wherein:
the processor is further configured to receive the user state data, and to determine the user is in a state that could adversely compromise probability assignment effectiveness, and selectively generate one or more alerts based on the one or more states of the user, and
the states of the user include one or more of states from the group consisting of user attention lapses, eye activity, and head movements.

* * * * *